United States Patent [19]

Tamura et al.

[11] Patent Number: 6,156,869

[45] Date of Patent: Dec. 5, 2000

[54] METHOD FOR PRODUCING POLYAMIDES

[75] Inventors: Kozo Tamura; Hideaki Oka; Kazunori Watanabe; Susumu Matsunaga, all of Kurashiki, Japan

[73] Assignee: Kuraray Co., Ltd., Kurashiki, Japan

[21] Appl. No.: 09/363,190

[22] Filed: Jul. 29, 1999

[30] Foreign Application Priority Data

Jul. 30, 1998 [JP] Japan .................................. 10-228535
Apr. 30, 1999 [JP] Japan .................................. 11-123804

[51] Int. Cl.$^7$ .................................................. C08G 69/26
[52] U.S. Cl. ......................... 528/310; 528/322; 528/335; 528/340; 528/347; 528/348; 525/432
[58] Field of Search ..................................... 528/310, 322, 528/335, 340, 347, 348; 525/432

[56] References Cited

U.S. PATENT DOCUMENTS 5,670,608 9/1997 Oka et al. ................................ 528/322

*Primary Examiner*—P. Hampton-Hightower
*Attorney, Agent, or Firm*—Oblon, Spivak, McClelland, Maier & Neustadt, P.C.

[57] ABSTRACT

A method for producing polyamides, and to a method for producing primary polycondensates which are intermediates for polyamide production. More precisely, the invention relates to a method for producing primary polycondensates, which comprises a step of polycondensing a dicarboxylic acid component having a terephthalic acid content of from 60 to 100 mol % and a diamine component in which the amount of 1,9-nonanediamine and/or 2-methyl-1,8-octanediamine falls between 60 and 100 mol %, in the presence of water of being from 15 to 35% by weight, at a reaction temperature falling between 250° C. and 280° C. and under a reaction pressure (P) that satisfies the following formula (1):

$$P_0 \geq P \geq 0.7 P_0 \qquad (1)$$

where $P_0$ indicates the saturated vapor pressure of water at the reaction temperature, to form a primary polycondensate, followed by a step of taking the resulting primary polycondensate as formed in the previous step out of the reactor in an atmospheric environment while it is at a temperature within the same range as in the previous step and has a water content within the same range as in the previous step. The invention further relates to a method of polymerizing the primary polycondensate prepared previously into a polyamide having an increased molecular weight.

22 Claims, No Drawings

METHOD FOR PRODUCING POLYAMIDES

BACKGROUND OF THE INVENTION

1. Field of the Invention

The present invention relates to a method for producing polyamides and to a method for producing a primary polycondensate which is an intermediate for polyamide production. More precisely, it relates to a method for producing a primary polycondensate, which comprises polycondensing a specific dicarboxylic acid component and a specific diamine component in the presence of a predetermined amount of water at a predetermined reaction temperature and under a predetermined reaction pressure to give a primary polycondensate, followed by taking the primary polycondensate out of the reactor to be in an atmospheric environment while the temperature and the water content of the primary polycondensate are still within the same ranges as those in the previous polycondensation step. The invention also relates to a method for producing polyamides, which comprises further polymerizing the primary polycondensate into a polyamide having an increased molecular weight.

2. Description of the Background

Since they have excellent properties and good melt-moldability, crystalline polyamides such as typically nylon 6, nylon 66 and others, have been being used widely for clothing, fibers for industrial materials, engineering plastics, etc. On the other hand, however, these general-purpose polyamides are regarded as problematic in that their heat resistance is poor and, when they have absorbed water, they often lose dimensional stability.

In recent years, in particular, high-quality polyamides in the field of electrical and electronic components, car parts, engineering plastics, etc., have been needed. For, example, with the development in the surface mounting technique (SMT) in the field of electrical and electronic devices, the polyamides to be used are required to have high heat resistance including reflow soldering heat resistance. Also, for car parts such as engine room parts, needed are polyamides having much more improved heat resistance. With their applications expanding, polyamides are being used not only in the field of electrical and electronic components and car parts but also in other various fields in which are needed polyamides having much better physical properties and functions. Given that situation, it is necessary to develop high-quality polyamides having not only good heat resistance but also good dimensional stability, good mechanical properties and good chemical resistance. In addition, it is also necessary that polyamides are easy to handle while they are produced through polymerization and while they are molded and worked into articles.

To meet the requirements, (1) a method of producing semi-aromatic polyamides from a dicarboxylic acid component essentially consisting of terephthalic acid and isophthalic acid or adipic acid and a diamine component essentially consisting of 1,6-hexanediamine or the like (see JP-A61-228022, 3-72564, 8-59825, 8-198963, etc.), and (2) a method of producing polyamides from 1,4-butanediamine and adipic acid (see U.S. Pat. No. 4,722,997) as known, and some of them have been industrialized.

For producing polyamides, a batch process of directly polymerizing a dicarboxylic acid component and a diamine component in melt in a pressure reactor has heretofore been widely employed. In this process, the polyamide produced is taken out of the reactor while in melt form. In the process, however, the polyamide produced must be kept at high temperatures of not lower than its melting point for a long period of time in the latter stage of the reaction and while the polyamide is taken out of the reactor. As a result, the polyamide is often degraded by heat, and its quality is degraded.

In particular, the semi-aromatic polyamides obtained according to technique (1) and the polyamides produced from 1,4-butanediamine and adipic acid according to technique (2) are readily pyrolyzed in the conventional batch process of direct melt polymerization, since their melting point is close to their decomposition point. In techniques (1) and (2), therefore, it is difficult to increase the molecular weight of polyamides without pyrolysis thereof.

Therefore, in techniques (1) and (2), monomers are not subjected to direct melt polymerization to give the desired polyamides. In melt polymerization, monomers are first condensed into a low-order condensate (primary condensate), and the low-order condensate is further polymerized into the desired polyamides having an increased molecular weight.

However, in technique (1), when 1,6-hexanediamine is used as the diamine component, the amido-group concentration in the polymer produced is increased. The chemical resistance, the water absorption resistance and the melt stability of the polymer having such a high amido-group concentration are poor. In addition, in (1), the dicarboxylic acid component comprises isophthalic acid and/or adipic acid as the comonomer, in addition to terephthalic acid, and the amount of the comonomer is relatively large. Copolymerization with isophthalic acid lowers not only the degree of crystallinity of the polymer formed but also the heat resistance, the chemical resistance, the water absorption resistance and the dimensional stability of the polymer. Copolymerization with adipic acid lowers the heat resistance and the melt stability of the polymer.

The polyamides obtained according to technique (2) are poly (tetramethyleneadipamide), which are of a type of aliphatic polyamides, and the heat resistance, chemical resistance and water absorption resistance thereof are inferior.

Regarding technique (1), the method described in JP-A 61-228022 and 3-72564 is problematic in that the low-order condensate formed therein has a low limiting viscosity and therefore could not be directly subjected to solid-phase polymerization. Therefore, in the method disclosed, the low-order condensate formed is once polymerized in melt into a prepolymer, and thereafter the resulting prepolymer is subjected to solid-phase polymerization into the intended semi-aromatic polyamides. The method comprises the multi-stage polymerization. This method requires complicated production steps and complicated equipment. Accordingly, the method requires significant labor and is expensive. In addition, in this method, an additional pressure container in which the pressure is controlled to be a predetermined one is provided adjacent to the outlet of the polymerization reactor, and the low-order, condensate produced in the reactor is taken out into the pressure container. This is in order to reduce the pressure difference between the reactor and the collector into which the low-order condensate is to be taken out of the reactor (see example 1 in JP-A3-72564). Therefore, the method requires the special pressure container having a specifically controlled inner pressure. The pressure container of that type requires special process control and equipment, and the method is complex and expensive.

Regarding technique (1), the method described in JP-A 8-59825 is problematic in that the step of preparing the primary condensate from starting monomers of essentially terephthalic acid and adipic acid, and 1,6-hexanediamine is actually effected at a high temperature above 280° C., and therefore, the primary condensate prepared is readily degraded under heat. In addition, in the method described therein, the pressure under which the primary condensate is prepared is low, specifically, it is lower than 23 kg/cm² G. Under such low pressure, a large amount of the monomers being reacted to give the primary condensate vaporize away during the reaction with the result that the proportions of the monomer, units constituting the resulting primary condensate significantly differ from those of the starting monomers as fed into the reactor. In this method, therefore, the primary condensate prepared often loses the original molar balance of the starting monomers.

Regarding technique (1), the method described in JP-A 8-198963 is problematic in that the primary condensate formed from starting monomers of essentially terephthalic acid and/or adipic acid, and 1,6-hexanediamine and/or dodecamethylenediamine is too much foamed (the foaming magnification is 5-fold or more), and has a low bulk density. Therefore in the post-step of polymerizing the primary condensate into a polymer having an increased molecular weight, grains of the primary condensate are readily broken or they often adhere to the wall of the polymerization reactor. In the post-polymerization step, the primary condensate grains are difficult to handle, and, in addition, the volume efficiency in the polymerization reactor is low.

In the method described in JP-A 8-59825 and 8-198963, the primary condensate formed is taken out of the reactor while water is fed thereinto through a separate line. In the method, therefore, taking out the primary condensate from the reactor involves time-consuming and troublesome operation.

Accordingly, there remains a need for methods of producing polyamides which overcome the disadvantages discussed above.

SUMMARY OF THE INVENTION

It is an object of the present invention is to provide an efficient method of producing polyamides having good properties of heat resistance, mechanical capabilities, water absorption resistance and chemical resistance.

It is another object of the invention is to provide a method for producing a primary polycondensate. It is also an object of the invention to provide a method of producing polyamides from the primary polycondensate.

Still another object of the invention is to provide a method for producing a primary polycondensate, in which the primary polycondensate produced is in the form of non-foaming powdery grains having a high bulk density. It is also an object of the invention to provide a method of producing polyamides from this primary polycondensate.

Still another object of the invention is to provide a simplified and efficient method for producing a primary polycondensate and also polyamides from the polycondensate. In the method, when the primary polycondensate formed in a reactor is taken out, it does not require any special collector such as pressure container having a specifically controlled inner pressure, and does not require water to be fed thereto through a separate water line. The primary polycondensate formed in the reactor can be directly taken out in an atmospheric environment in a simplified manner, and the thus taken out primary polycondensate has good properties, such as those described above.

The present inventors have discovered a simple process for producing a primary polycondensate and for further polymerizing it into polyamides having an increased molecular weight. Specifically, in the process, a dicarboxylic acid component having a terephthalic acid content of from 60 to 100 mol % and a diamine component in which the amount of at least one of 1,9-nonanediamine and 2-methyl-1,8-octanediamine falls between 60 and 100 mol % are used, and the dicarboxylic acid component and diamine component are polycondensed in the presence of water of being from 15 to 35% by weight, at a reaction temperature falling between 250° C. and 280° C. and under, a reaction pressure of from 0.7 times to 1 time the saturated vapor pressure of water at the reaction temperature to give a primary polycondensate, and thereafter the resulting primary polycondensate is taken out of the reactor in an atmospheric environment while it is at a temperature within the same range as previously and has a water content within the same range as previously. The primary polycondensate thus produced is of high quality, and the process is simple and provides high productivity. Further, polymerizing the primary polycondensate produced in the process gives high quality polyamides having an increased molecular weight and having excellent properties in terms of heat resistance, mechanical capabilities, water absorption resistance and chemical resistance.

The present inventors have found that the primary polycondensate produced according to the process described above is degraded only slightly by heat and can be directly subjected to solid-phase polymerization since it has a high limiting viscosity; the primary polycondensate is also degraded only slightly by side reaction even in melt polymerization to give polyamides having an increased molecular weight; the primary polycondensate is in the form of non-foaming powdery grains having a high bulk density and is easy to handle; and in a polymerization reactor, the volume efficiency of the primary polycondensate is high.

The present inventors have also found that the polycondensation to give the primary polycondensate is effected more smoothly in the presence of a phosphorus-based catalyst, and the primary polycondensate thus produced in the presence of such a phosphorus-based catalyst has much better quality, without being colored, gelled or degraded; when the polycondensation is effected in the presence of a terminal-blocking agent, then the molecular weight of the resulting primary polycondensate can be well controlled, and the melt stability thereof is much more increased. On the basis of these findings, we have completed the present invention.

Accordingly, the objects of invention, and others, may be accomplished with a method for producing polyamides, which comprises the following:

(i) polycondensing a dicarboxylic acid component having a terephthalic acid content of from 60 to 100 mol % and a diamine component in which the amount of at least one of 1,9-nonanediamine and 2-methyl-1,8-octanediamine, falls between 60 and 100 mol %, in the presence of water of being from 15 to 35% by weight, at a reaction temperature falling between 250° C. and 280° C. and under a reaction pressure (P) that satisfies the following formula (1):

$$P_0 \geq P \geq 0.7 P_0 \qquad (1)$$

where $P_0$ is the saturated vapor pressure of water at the reaction temperature, to form a primary polycondensate;

(ii) removing the resulting primary polycondensate as formed in (i) from the reactor in an atmospheric environment while it is at a temperature within the same range as in (i) and has a water content within the same range as in (i);

(iii) subjecting the primary polycondensate from (ii) to solid-phase polymerization or melt polymerization to give a polyamide having an increased molecular weight.

The invention also provides a method for producing primary polycondensates, which comprises the following:

(i) polycondensing a dicarboxylic acid component having a terephthalic acid content of from 60 to 100 mol % and a diamine component in which the amount of at least one of 1,9-nonanediamine and 2-methyl-1,8-octanediamine falls between 60 and 100 mol %, in the presence of water of being from 15 to 35% by weight, at a reaction temperature falling between 250° C. and 280° C. and under a reaction pressure (P) that satisfies the following formula (1):

$$P_0 \geq P \geq 0.7 P_0 \tag{1}$$

where $P_0$ indicates the saturated vapor pressure of water at the reaction temperature, to form a primary polycondensate;

(ii) removing the primary polycondensate from (i) from the reactor in an atmospheric environment while it is at a temperature within the same range as in (i) and has a water content within the same range as in (i).

In more particular embodiments, the method for producing polyamides and the method for producing primary polycondensates, the polycondensation to give the primary polycondensates is preferably effected in the presence of a phosphorous-based catalyst and/or a terminal-blocking agent, more preferably in the presence of a phosphorous-based catalyst and a terminal-blocking agent.

A more complete appreciation of the invention and many of the attendant advantages thereof will be readily obtained as the same becomes better understood by reference to the following detailed description.

DETAILED DESCRIPTION OF THE INVENTION

The method of the invention has the advantages of smooth operation and high productivity. The primary polycondensate being produced in the method undergoes only slight thermal degradation, and its limiting viscosity is high. As neither aggregating nor fusing, the primary polycondensate may be directly subjected to solid-phase polymerization to produce a polymer having an increased molecular weight. Even in melt polymerization, the resulting polymer is degraded only slightly by side reactions.

While being subjected to the post-step of polymerization into a polymer having an increased molecular-weight, the primary polycondensate grains are broken only slightly, and adhere only slightly to the wall of the apparatus used. In addition, they show at most little aggregation, and are easy to handle in the post-polymerization step. Moreover, the volume efficiency in the post-step apparatus for polymerization of the primary polycondensate is high.

In the invention, the starting monomers for producing the primary polycondensate include a dicarboxylic acid component having a terephthalic acid content of from 60 to 100 mol % and a diamine component in which the amount of at least one of 1,9-nonanediamine and 2-methyl-1,8-octanediamine falls between 60 and 100 mol % (for the two diamines combined, the total amount of the two shall fall within the range).

If the terephthalic acid content of the dicarboxylic acid component is smaller than 60 mol %, the polyamides produced may be unfavorable, as their properties including heat resistance and chemical resistance may be poor. If the amount of at least one of 1,9-nonanediamine and 2-methyl-1,8-octanediamine in the diamine component is smaller than 60 mol %, the polyamides produced may be also unfavorable as their properties including heat resistance, chemical resistance, water absorption resistance and melt stability will be poor.

Preferably, in the invention, the terephthalic acid content of the dicarboxylic acid component to be used falls between 75 and 100 mol %. This range includes all specific values and subranges therebetween, such as 80, 85, 90, 95 and 99 mol %.

Also preferably, the amount of at least one of 1,9-nonanediamine and 2-methyl-1,8-octanediamine of the diamine component to be used falls between 75 and 100 mol %, more preferably between 90 and 100 mol %. These ranges include all specific values and subranges therebetween, such as 80, 85, 95, 98 and 99 mol %.

The diamine component to be used in the invention may contain only either one of 1,9-nonanediamine and 2-methyl-1,8-octanediamine, or may contain both diamines. Preferably, the diamine component is 1,9-nonanediamine alone, or both 1,9-nonanediamine and 2-methyl-1,8-octanediamine.

Along with terephthalic acid, any other dicarboxylic acids may be in the dicarboxylic acid component in an amount of not larger than 40 mol %. The additional dicarboxylic acids include, for example, aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid, etc.; alicyclic dicarboxylic acids such as 1,3-cyclopentanedicarboxylic acid, 1,4-cyclohexanedicarboxylic acid, etc.; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxy-diacetic acid, diphenic acid, 4,4'-oxybis(benzoic acid), diphenylmethane-4,4'-dicarboxylic acid, diphenylsulfone-4,4'-dicarboxylic acid, 4,4'-biphenyldlcarboxylic acid, etc. One or more those additional dicarboxylic acids may be used either singly or as combined. Of the additional dicarboxylic acids that may be used along with terephthalic acid, preferred are aromatic dicarboxylic acids as giving polyamides having good heat resistance. If desired, a small amount of polycarboxylic acids (i.e., more than two acid groups, e.g., tri-carboxylic acids) such as trimellitic acid, trimesic acid, pyromellitic acid and the like may also be in the dicarboxylic acid component, without interfering with the effect of the invention.

Along with 1,9-nonanediamine and/or 2-methyl-1,8-octanediamine, the diamine component may comprise any other diamines in an amount of not larger than 40 mol %. The additional diamines include, for example, linear, aliphatic diamines such as ethylenediamine, propanediamine, 1,4-butanediamine, 1,6-hexanediamine, 1,7-heptanediamine, 1,8-octanediamine, 1,10-decanediamine, 1,11-undecanediamine, 1,12-dodecanediamine, etc.; branched chain aliphatic diamines such as 3-methyl-1,5-pentanediamine, 2,2,4-trimethyl-1,6-hexanediamine, 2,4,4-trimethyl-1,6-hexanediamine, 5-methyl-1,9-nonanediamine, etc.; alicyclic diamines such as cyclolhexanediamine, methylcyclohexanediamine, isophoronealamine, bis(4-aminocyclohexyl)methane, norbornanedimethanamine, tricyclodecanedimethanamine, etc.; and aromatic diamines such as p-phenylenediamine, m-phenylenediamine, xylylenediamine, 4,4'-diaminodiphenyl sulfone, 4,4'-diaminodiphenyl ether, etc. One or more those additional diamines may be used either singly or as combined.

As the additional diamines that may be used along with 1,9-nonanediamine and/or 2-methyl-1,8-octanediamine, preferred is at least one of 1,6-hexanediamine, 1,7-heptanediamine, 1,8-octanediamine, 1,10-decanediamine, 1,11-undecanediamine and 1,12-dodecanediamine, as giving polyamides having good properties of heat resistance, chemical resistance and melt stability.

For producing a primary polycondensate through polycondensation of the dicarboxylic acid consisting essentially of terephthalic acid (hereinafter this may be simply referred to as "dicarboxylic acid component") and the diamine component consisting essentially of 1,9-nonanediamine and/or 2-methyl-1,8-octanediamine (hereinafter this may be simply referred to as "diamine component"), for example, employable is any among the following: (1) a method of producing the primary polycondensate from the dicarboxylic acid component of free dicarboxylic acids and the diamine component of free diamines, (2) a method of producing the primary polycondensate from salts (nylon salts) as previously formed from the dicarboxylic acid component and the diamine component, and (3) a method of producing the primary polycondensate from the dicarboxylic acid component of free dicarboxylic acids and the diamine component of free diamines along with a salt of the dicarboxylic acid component and the diamine component.

In producing the primary polycondensate, the ratio of the carboxyl group to the amino group is preferably such that the amino group is in an amount of from 0.95 to 1.05 equivalent relative to one equivalent of the carboxyl group. In that range, the polycondensation is attained smoothly, and the primary polycondensate formed could have a high limiting viscosity and could have good melt stability.

In the invention, the polycondensation of the dicarboxylic acid component and the diamine component must be effected in the presence of water of being from 15 to 35% by weight, but preferably from 20 to 30% by weight. These ranges include all specific values and subranges therebetween, such as 18%, 22%, 25%, 28% and 32% by weight. In the step of polycondensation of the dicarboxylic acid component and the diamine component, if the amount of water existing in the reaction system is smaller than 15% by weight, the system will be solidified during the polycondensation or while the primary polycondensate formed is taken out. If so, one will have some system trouble in that the polycondensation could not be attained smoothly and that the primary polycondensate formed is difficult to take out of the reactor. In addition, the primary polycondensate as taken out of the reactor will foam to have a small bulk density, and it will be difficult to handle. Moreover, it will interfere with the increase in the volume efficiency in the subsequent step. On the other hand, if the amount of water existing in the polycondensation system is larger than 35% by weight, the reaction speed may be lowered, and, in addition, the degree of equilibrium polymerization in the system will also be lowered. As a result, the polycondensation will take a lot of time, and the limiting viscosity of the primary polycondensate formed will be greatly lowered. The next solid-phase polymerization of the primary polycondensate will be difficult.

The "amount of water" as referred to herein for the reaction system is meant to indicate the amount of water existing in the reaction system, i.e., the reaction mixture based on the total weight of the entire reaction system (that is, the total weight of the liquid component and the solid component constituting the reaction mixture in the system).

The means of controlling the amount of water in the reaction system for, the polycondensation of the dicarboxylic acid component and the diamine component so as to be within the defined range of from 15 to 35% by weight is not specifically defined. For example, employable are any among the following:

A method of previously preparing an aqueous solution or slurry of either one or both of the dicarboxylic acid component and the diamine component (comprising free dicarboxylic acids, free diamines and/or salts of dicarboxylic acids and diamines, etc.) in such a manner that the amount of water existing in the reaction system could fall between 15 and 35% by weight, followed by feeding the resulting aqueous solution or slurry into a reactor;

A method of directly but separately feeding the dicarboxylic acid component and the diamine component (comprising free dicarboxylic acids, free diamines and/or salts of dicarboxylic acids and diamines, etc.) and also water into a reactor in such a manner that the amount of water existing in the reaction system could fall between 15 and 35% by weight.

A method of preparing an aqueous solution or slurry of either one or both of the dicarboxylic acid component and the diamine component (comprising free dicarboxylic acids, free diamines and/or salts of dicarboxylic acids and diamines, etc.), which, however, has a low concentration so that it is easy to handle, then feeding the resulting aqueous solution or slurry into a reactor, and removing excess water from the reaction system in the reactor while the system is heated or subjected to polycondensation therein so that the amount of water to be finally in the polycondensation system could fall between 15 and 35% by weight.

In the invention, the dicarboxylic acid component and the diamine component are subjected to polycondensation in the presence of water of being from 15 to 35% by weight as so mentioned above, at a reaction temperature falling between 250° C. and 280° C. and under a reaction pressure (P) that satisfies the following formula (1) to give a primary polycondensate:

$$P_0 \geq P \geq 0.7 P_0 \tag{1}$$

where $P_0$ indicates the saturated vapor pressure of water at the reaction temperature.

In the step of forming the primary polycondensate, if the reaction temperature is lower than 250° C., the polycondensation rate may be low and the primary polycondensate formed may not have a high limiting viscosity. On the other hand, if the reaction temperature is higher than 280° C., the primary polycondensate formed will be degraded and colored. Preferably, the reaction temperature for the polycondensation to give the primary polycondensate falls between 260 and 275° C.

Lowering the reaction pressure in the step of forming the primary polycondensate through polycondensation below the defined limit of $0.7 P_0$ (that is, below 0.7 times the saturated vapor pressure of water at the reaction temperature) requires degassing the reactor, by which, however, significant amounts of water vapor will be discharged out of the reactor. If so, not only water but also monomers and oligomers will much vaporize away from the reactor, and the primary polycondensate formed will lose the intended molar balance between the diamine component and the dicarboxylic acid component constituting it. As a result, the primary polycondensate could not be polymerized to a desired degree in the next polymerization step, and the resulting polymer could not have the intended degree of polymerization. In addition, side reactions in the polymerization step may not be negligible.

In the invention, preferably, the polycondensation to give the primary polycondensate is effected in the presence of a phosphorous-based catalyst for the purpose of increasing the polycondensation rate and of preventing the primary polycondensate formed through the polycondensation from being degraded. The phosphorus-based catalyst includes, for example, phosphoric acid, phosphorous acid, hypophosphorous acid, and their salts and esters. Of those, preferred are hypophosphorous acid and its derivatives, as having the ability to improve the quality of the primary polycondensate and even the quality (especially, heat resistance, color tone) of polyamides to be produced through subsequent polymerization of the primary polycondensate. More preferred is sodium hypophosphite, as having the advantages of availability and handleability in addition to the quality-improving ability noted above. The amount of the phosphorous-based catalyst to be added to the reaction system preferably falls between 0.01 and 5% by weight, more preferably between 0.05 and 2% by weight, even more preferably between 0.07 and 1% by weight, relative to the total amount of the dicarboxylic acid component and the diamine component constituting the system. The phosphorus based catalyst, if added in an amount of smaller than 0.01% by weight, will only slightly accelerate the polycondensation, and the primary polycondensate formed in the presence of such a minor amount of a phosphorus-based catalyst will be unfavorably colored or degraded. On the other hand, adding a larger amount of a phosphorus-based catalyst over 5% by weight to the polycondensation system is unfavorable, as rather lowering the degree of polycondensation. In addition, the primary polycondensate formed in the presence of such a large amount of a phosphorus-based catalyst will be unfavorably colored or gelled.

Also preferably, the polycondensation is effected in the presence of a terminal-blocking agent. The terminal-blocking agent, if added, facilitates the molecular weight control of the polyamide formed, and improves the melt stability thereof. The terminal-blocking agent for use herein is not specifically defined, and may be any and every monofunctional compound having reactivity with the terminal amino group or the terminal carboxyl group of the primary polycondensate being formed. For example, it includes monocarboxylic acids, monoamines, acid anhydrides such as phthalic anhydride, monoisocyanates, monoacid halides, monoesters, monoalcohols, etc. Of those, preferred are monocarboxylic acids and monoamines as the terminal-blocking agent for use herein, since their reactivity is high and since the terminals of polycondensates are stably blocked with them. More preferred are monocarboxylic acids, as they are easy to handle while naturally having the advantages noted above.

The monocarboxylic acids preferably used herein as the terminal-blocking agent are not specifically limited, provided that they are reactive with amino groups. For example, they include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, isobutyric acid, etc.; alicyclic monocarboxylic acids such as cyclohexanecarboxylic acid, etc.; aromatic monocarboxylic acids such as benzoic acid, toluic acid, α-naphthalenecarboxylic acid, β-naphthalenecarboxylic acid, methylnaphthalenecarboxylic acid, phenylacetic acid, etc.; and mixtures of any of them. Of those, especially preferred are acetic acid, propionic acid, butyric acid, valeric acid, caproic acid, caprylic acid, lauric acid, tridecanoic acid, myristic acid, palmitic acid, stearic acid and benzoic acid, in view of their reactivity and costs and of the stability of the blocked terminals.

The monoamines preferably used herein as the terminal-blocking agent are not also specifically limited, provided that they are reactive with carboxyl groups. For example, they include aliphatic monoamines such as methylamine, ethylamine, propylamine, butylamine, hexylamine, octylamine, decylamine, stearylamine, dimethylamine, diethylamine, dipropylamine, dibutylamine, etc.; alicyclic monoamines such as cyclohexylamine, dicyclohexylamine, etc.; aromatic amines such as aniline, toluidine, diphenylamine, naphthylamine. etc.; and mixtures of any of them. Of those, especially preferred are butylamine, hexylamine, octylamine, decylamine, stearylamine, cyclohexylamine and aniline, in view of their reactivity and costs and of the stability of the blocked terminals. The amount of the terminal-blocking agent to be used in producing the primary polycondensate varies, depending on the reactivity and the boiling point of the agent itself and on the reaction apparatus and the reaction condition employed. In general, however, it is desirable that the amount of the agent to be used falls between 0.1 and 15 mol % relative to the number of mols of all dicarboxylic acids and diamines used for the polycondensation.

Preferably, the polycondensation to give the primary polycondensate is so effected that the primary polycondensate formed and taken out of the reactor could have a limiting viscosity [η] of at least 0.08 dl/g, more preferably at least 0.12 dl/g, even more preferably at least 0.15 dl/g, as measured in concentrated sulfuric acid at 30° C.

The reaction time for the polycondensation to give the primary polycondensate varies, depending on the reaction temperature and on the amount of water existing in the polycondensation system. So far as the polycondensation is effected under the reaction condition defined herein, the reaction time for it maybe generally 5 hours or shorter, within which the primary polycondensate formed could have a limiting viscosity of at least 0.08 dl/g as measured under the condition noted above and have a satisfactorily high degree of polymerization.

The polycondensation to give the primary polycondensate in the method of the invention may be attained either batchwise or continuously.

For the purpose of preventing the primary polycondensate formed from adhering the wall of the reactor used, of ensuring uniform polycondensation and of obtaining powdery grains of the primary polycondensate having a uniform grain size, it is desirable that the polycondensation system to give the primary polycondensate is stirred.

The primary polycondensate formed in the polycondensation step is taken out of the reactor. The polycondensate is taken out in an atmosphere environment while the temperature of the reaction system is still in the defined range of from 250° C. to 280° C. and while the amount of water existing in the reaction system is also still in the defined range of from 15 to 35% by weight.

Taking the primary polycondensate out of the reactor in the method of the invention does not require any specific pressure container, having a specifically controlled inner pressure for product collection and does not require any troublesome operation of feeding water into the reactor through a separate water line. In the method of the invention, the primary polycondensate formed can be directly taken out of the reactor in an atmospheric environment while the temperature of the reaction system containing it is kept to be within the defined range as above and while the amount of water existing in the reaction system is also kept to be within the defined range as above. In that condition, the primary polycondensate as taken out of the reactor is degraded little by heat, and it is in the form of non-foaming powdery grains (including powders and granules), having a satisfactorily high limiting viscosity and a high bulk density. According to the method of the invention, the primary polycondensate formed can be taken out in such an extremely simplified manner, and its productivity is high.

The speed at which the primary polycondensate is taken out of the reactor may be controlled, depending on the scale of the reactor, the amount of the contents of the reactor, the ambient temperature, the size of the discharging mouth, and the length of the discharging nozzle. In general, however, it is desirable that the primary polycondensate is taken out at a linear speed of from 10 to 100 m/sec, at which the taking-out time is shortened to improve the productivity and the primary polycondensate being taken out is prevented from adhering to the wall of the taking-out device. The primary polycondensate thus taken out of the reactor in that condition is immediately cooled to 130° C. or lower, preferably 100° C. or lower by the latent heat of water that vaporizes away while the primary polycondensate is taken out. Therefore, even though the primary polycondensate is taken out in air in an atmospheric condition, it is degraded little by oxygen. However, in order to surely protect the primary polycondensate from being degraded through oxidation, it is more desirable to take it out into a nitrogen atmosphere in an atmospheric condition.

According to the method mentioned above, the primary polycondensate formed has a limiting viscosity [η], as measured in concentrated sulfuric acid at 30° C., of preferably at least 0.08 dl/g, more preferably at least 0.12 dl/g, even more preferably at least 0.15 dl/g.

The primary polycondensate obtained herein has a satisfactorily high limiting viscosity, as above, and therefore can be directly subjected to solid-phase polymerization at high temperatures to give polyamides having an increased molecular weight. During the solid-phase polymerization, the powdery grains of the primary polycondensate do neither fuse nor aggregate even at high temperatures. In addition, the primary polycondensate can also be subjected to melt polymerization, in which it is degraded little by side reaction.

The primary polycondensate formed herein is generally in the form of non-foaming powdery grains or granules having a high bulk density of at least 0.25. Therefore, in the post-step of polymerizing it into polyamides having an increased molecular weight, the granular primary polycondensate is broken little, aggregates little and adheres little to the wall of the polymerization device used, and it is easy to handle. In addition, a large amount of the primary polycondensate can be charged into the polymerization device, and the volume efficiency in the post-polymerization step is high.

If desired, the primary polycondensate may be subjected to compacting treatment or granulation so as to further increase its bulk density and to dress the grains.

Having been taken out of the reactor in the manner noted above, the primary polycondensate is then polymerized into polyamides having an increased molecular weight. The polymerization of the primary polycondensate may be effected in any desired manner. For example, it may be directly polymerized, just after having been taken out of the reactor; or after taken out of the reactor, the primary polycondensate may be dried and then polymerized; or the primary polycondensate taken out of the reactor, may be stored once and then polymerized later; or the primary polycondensate taken out of the reactor may be subjected to compacting treatment or granulation, as above, and then polymerized.

The primary polycondensate may be polymerized in a solid phase or in a molten phase. The solid-phase polymerization is advantageous in that the polyamides obtained are degraded little by heat, and the melt polymerization is advantageous in that the time for it is short. For the invention, the solid-phase polymerization is preferred, since the polyamides produced have better properties of heat resistance, chemical resistance, dimensional stability and color tone.

The method and the condition for the solid-phase polymerization of the primary polycondensate are not specifically defined. Any method and any condition are employable, so far as the primary polycondensate is polymerized all the time in a solid condition and it does not fuse, aggregate and degrade. One preferred method is to polymerize the primary polycondensate by gently stirring it at a temperature not higher than its melting point, generally falling between 200 and 280° C., for a period of from 2 to 20 hours or so. In order to prevent the oxidative degradation of the primary polycondensate being polymerized and even the polyamides being formed from it, it is desirable that the solid-phase polymerization is effected in an inert gas atmosphere of, for example, nitrogen gas, carbon dioxide gas or the like, or under reduced pressure.

The method and the condition for the melt polymerization of the primary polycondensate are not also specifically defined. Any method and any condition are employable, so far as the primary polycondensate can be polymerized in melt with minimizing its thermal degradation. One preferred method is to polymerize the primary polycondensate by feeding it into a melting device such as an extruder or the like, followed by heating it therein at a temperature not lower than its melting point, generally falling between 260 and 350° C., for a period of from 1 to 10 minutes or so.

In the invention, if desired, any additives including various fibrous materials such as glass fibers, carbon fibers and the like, as well as inorganic powdery fillers, organic powdery fillers, colorants, UV absorbents, light stabilizers, antioxidants, antistatic agents, flame retardants, crystallization promoters, plasticizers, lubricants and others, and any other polymers may be added to the primary polycondensate and to the polyamides from it, in any stages of producing the primary polycondensate, or polymerizing it (in particular, through melt polymerization), or after the polymerization step.

The polyamides obtained in the invention have excellent properties of heat resistance, mechanical capabilities, water absorption resistance and chemical resistance. Having such excellent properties, the polyamides can be molded or spun into various articles or fibers, either by themselves or optionally as combined with various additives as above and other polymers in the form of compositions. For molding or spinning them, employable are any molding methods and spinning methods generally known for ordinary polyamides. For example, employable are methods of injection molding, blow molding, extrusion molding, compression molding, drawing, vacuum molding and the like, and methods of melt spinning and the like. The molded articles and the spun fibers have many applications not only for engineering plastics but also for other industrial materials and manufacturing materials for electrical and electronic appliances, car parts, office appliances and others, and for household utensils.

Having generally described this invention, a further understanding can be obtained by reference to certain specific examples which are provided herein for purposes of illustration only and are not intended to be limiting unless otherwise specified.

EXAMPLES

In the following Examples, the bulk density of the primary polycondensates prepared, the limiting viscosity [η] of the primary polycondensates and the polyamides prepared, the tensile strength and the tensile elongation of the polyamides were measured according to the methods mentioned below.
(1) Bulk Density of Primary Polycondensate:
Measured according to JIS K-6911.
(2) Limiting Viscosity [η] of Primary Polycondensate and Polyamide:
A sample of the primary polycondensate or the polyamide to be measured is dissolved in concentrated sulfuric acid to prepare sample solutions having a concentration of 0.05, 0.1, 0.2 or 0.4 g/dl, and the inherent viscosity (η) of each sample solution is measured at 30° C. Extrapolating the data with the control having a concentration of 0 gives the limiting viscosity [η] of the sample.
(3) Tensile Strength and Tensile Elongation of Polyamide:
The polyamides prepared in the following Examples and Comparative Examples were formed into JIS No. 1 dumbbell-type test pieces (thickness: 3 mm), which were tested for their tensile strength and tensile elongation according to JIS K-7113, incorporated herein by reference.

Example 1

(1) 163.64 g (0.985 mols) of terephthalic acid, 134.55 g (0.85 mols) of 1,9-nonanediamine, 23.74 g (0.15 mols) of 2-methyl-1,8-octanediamine, 3.664 g (0.030 mols) of benzoic acid, 0.326 g of sodium hypophosphite monohydrate, and 108.64 g of water were put into a one-liter autoclave, and purged with nitrogen. The amount of water existing in the reaction system was 25% by weight. Heating this for 2 hours, its inner temperature reached 260° C. In that condition, the compounds were reacted for 1 hour. During the reaction, the autoclave was closed and the contents thereof were stirred all the time. The inner pressure was 46 atmospheres ($1.0P_0$).

(2) Next, while the inner temperature of the reactor was kept at 260° C. and the amount of water existing in the reactor was 25% by weight, the reaction product in (1) was taken out of the reactor into a collector having a nitrogen atmosphere and having ordinary temperature and ordinary pressure, over a period of 3 minutes, through the nozzle (6 mm in diameter) at the bottom of the reactor. Then, this was dried at 120° C. to obtain a powdery, non-foaming primary polycondensate. The bulk density and the limiting viscosity of this primary polycondensate were measured according to the methods mentioned above. The data are shown in Table 1.

(3) 250 g of the powdery primary polycondensate obtained in (2) was put into a one-liter round-bottom flask, and purged with nitrogen. With nitrogen being introduced thereinto at a flow rate of 300 ml/min, this was stirred and heated, and its inner temperature reached 250° C. over a period of 2 hours. In that condition, this was polymerized for 5 hours in a solid phase to give a polyamide. The resulting polyamide was cooled to around room temperature, and then taken out of the round-bottom flask. Its limiting viscosity was measured according to the method mentioned above, and shown in Table 1.

(4) The polyamide obtained in (3) was formed into JIS No. 1 dumbbell-type test pieces (thickness: 3 mm) through injection molding, for which the cylinder temperature was 330° C. and the mold temperature was 150° C. Their tensile strength and tensile elongation were measured according to the methods mentioned above, and shown in Table 1.

Example 2

(1) 163.64 g (0.985 mols) ofterephthalic acid, 158.29 g (1.00 mol) of 1,9-nonanediamine, 3.664 g (0.030 mols) of benzoic acid, 0.326 g of sodium hypophosphite monohydrate, and 139.68 g of water were put into a one-liter autoclave, and purged with nitrogen. The amount of water existing in the reaction system was 30% by weight. Heating this for 2 hours, its inner temperature reached 270° C. In that condition, the compounds were reacted for 1 hour. During the reaction, the autoclave was closed and the contents thereof were stirred all the time. The inner pressure was 54 atmospheres ($1.0P_0$).

(2) Next, while the inner temperature of the reactor was kept at 270° C. and the amount of water existing in the reactor was 30% by weight, the reaction product in (1) was taken out of the reactor into a collector having a nitrogen atmosphere and having ordinary temperature and ordinary pressure, over a period of 3 minutes, through the nozzle (6 mm in diameter) at the bottom of the reactor. Then, this was dried at 120° C. to obtain a powdery, non-foaming primary polycondensate. The bulk density and the limiting viscosity of this primary polycondensate were measured according to the methods mentioned above, and shown in Table 1.

(3) 250 g of the powdery primary polycondensate obtained in (2) was put into a one-liter round-bottom flask, and purged with nitrogen. With nitrogen being introduced thereinto at a flow rate of 300 ml/min, this was stirred and heated, and its inner temperature reached 250° C. over a period of 2 hours. In that condition, this was polymerized for 5 hours in a solid phase to give a polyamide. The resulting polyamide was cooled to around room temperature, and then taken out of the round-bottom flask. Its limiting viscosity was measured according to the method mentioned above, and shown in Table 1.

(4) The polyamide obtained in (3) was formed into JIS No. 1 dumbbell-type test pieces (thickness: 3 mm) through injection molding, for which the cylinder temperature was 340° C. and the mold temperature was 150° C. Their tensile strength and tensile elongation were measured according to the methods mentioned above, and shown in Table 1.

Example 3

(1) 163.64 g (0.985 mols) ofterephthalic acid, 79.15 g (0.50 mols) of 1,9-nonanediamine, 79.15 g (0.50 mols) of 2-methyl-1,8-octanediamine, 3.664 g (0.030 mols) of benzoic acid, 0.326 g of sodium hypophosphite monohydrate (0.1% by weight relative to the starting monomers), and 108.64 g of water were put into a one-liter autoclave, and purged with nitrogen. The amount of water existing in the reaction system was 25% by weight. Heating this for 2 hours, its inner temperature reached 250° C. In that condition, the compounds were reacted for 1 hour. During the reaction, the autoclave was closed and the contents thereof were stirred all the time. The inner pressure was 39 atmospheres ($1.0P_0$).

(2) Next, while the inner temperature of the reactor was kept at 250° C. and the amount of water existing in the reactor was 25% by weight, the reaction product in (1) was taken out of the reactor into a collector having a nitrogen atmosphere and having ordinary temperature and ordinary pressure, over a period of 3 minutes, through the nozzle (6 mm in diameter) at the bottom of the reactor. Then, this was dried at 120° C. to obtain a powdery, non-foaming primary polycondensate. The bulk density and the limiting viscosity of this primary polycondensate were measured according to the methods mentioned above, and shown in Table 1.

(3) 250 g of the powdery primary polycondensate obtained in (2) was put into a one-liter round-bottom flask, and purged with nitrogen. With nitrogen being introduced thereinto at a flow rate of 300 ml/min, this was stirred and heated, and its inner temperature reached 230° C. over a period of 2 hours. In that condition, this was polymerized for 10 hours in a solid phase to give a polyamide. The resulting polyamide was cooled to around room temperature, and then taken out of the round-bottom flask. Its limiting viscosity was measured according to the method mentioned above, and shown in Table 1.

(4) The polyamide obtained in (3) was formed into JIS No. 1 dumbbell-type test pieces (thickness: 3 mm) through injection molding, for which the cylinder temperature was 290° C. and the mold temperature was 150° C. Their tensile strength and tensile elongation were measured according to the methods mentioned above, and shown in Table 1.

Example 4

(1) 163.64 g (0.985 mols) of terephthalic acid, 134.55 g (0.8–5 mols) of 1,9-nonanediamine, 23.74 g (0.15 mols) of 2-methyl-1,8-octanediamine, 5.495 g (0.045 mols) of benzoic acid, 0.326 g of sodium hypophosphite monohydrate, and 81.48 g of water were put into a one-liter autoclave, and purged with nitrogen. The amount of water existing in the reaction system was 20% by weight. Heating this for 2 hours, its inner temperature reached 270° C. In that condition, the compounds were reacted for 1 hour. During the reaction, the autoclave was closed and the contents thereof were stirred all the time. The inner pressure was 54 atmospheres ($1.0P_0$).

(2) Next, while the inner temperature of the reactor was kept at 270° C. and the amount of water existing in the reactor was 20% by weight, the reaction product in (1) was taken out of the reactor into a collector having a nitrogen atmosphere and having ordinary temperature and ordinary pressure, over a period of 3 minutes, through the nozzle (6 mm in diameter) at the bottom of the reactor. Then, this was dried at 120° C. to obtain a powdery, non-foaming primary polycondensate. The bulk density and the limiting viscosity of this primary polycondensate were measured according to the methods mentioned above, and shown in Table 1.

(3) The powdery primary polycondensate obtained in (2) was fed into a double-screw extruder with a vent (diameter of screw: 25 mm, length thereof: 625 mm) and polymerized in melt therein to give a polyamide, for which the cylinder temperature was 330° C., the mean residence time was 5 minutes and the degassification through the vent amounted to 10 mm Hg. The limiting viscosity of the polyamide was measured according to the method mentioned above, and shown in Table 1.

(4) The polyamide obtained in (3) was formed into JIS No. 1 dumbbell-type test pieces (thickness: 3 mm) through injection molding, for which the cylinder temperature was 330° C. and the mold temperature was 150° C. Their tensile strength and tensile elongation were measured according to the methods mentioned above, and shown in Table 1.

Comparative Example 1

(1) 81.82 g (0.493 mols) of terephthalic acid, 67.27 g (0.425 mols) of 1,9-nonanediamine, 11.87 g (0.075 mols) of 2-methyl-1,8-octanediamine, 1.832 g (0.015 mols) of benzoic acid, 0.163 g of sodium hypophosphite monohydrate, and 244.43 g of water were put into a one-liter autoclave, and purged with nitrogen. The amount of water existing in the reaction system was 60% by weight. Heating this for 2 hours, its inner temperature reached 260° C. In that condition, the compounds were reacted for 1 hour. During the reaction, the autoclave was closed and the contents thereof were stirred all the time. The inner pressure was 46 atmospheres ($1.0P_0$).

(2) Next, while the inner-temperature of the reactor was kept at 260° C. and the amount of water existing in the reactor was 60% by weight, the reaction product in (1) was taken out of the reactor into a collector having a nitrogen atmosphere and having ordinary temperature and ordinary pressure, over a period of 3 minutes, through the nozzle (6 mm in diameter) at the bottom of the reactor. Then, this was dried at 120° C. to obtain a powdery primary polycondensate. The bulk density and the limiting viscosity of this primary polycondensate were measured according to the methods mentioned above, and shown in Table 2.

(3) 250 g of the powdery primary polycondensate obtained in (2) was put into a one-liter round-bottom flask, and purged with nitrogen. With nitrogen being introduced thereinto at a flow rate of 300 ml/min, this was stirred and heated, and its inner temperature reached 250° C. over a period of 2 hours. In that condition, however, the polymer grains fused together while being heated, and the system was cut off as it was impossible to continue the solid-phase polymerization.

Comparative Example 2

163.64 g (0.985 mols) of terephthalic acid, 134.55 g (0.85 mols) of 1,9-nonanediamine, 23.74 g (0.15 mols) of 2-methyl-1,8-octanediamine, 3.664 g (0.030 mols) of benzoic acid, 0.326 g of sodium hypophosphite monohydrate, and 16.30 g of water were put into a one-liter autoclave, and purged with nitrogen. The amount of water existing in the reaction system was 5% by weight. Heating this for 2 hours, its inner temperature reached 260° C. In that condition, the compounds were reacted for 1 hour, but the system was entirely solidified during the reaction and could not be taken out of the reactor. During the reaction, the inner pressure was 46 atmospheres ($1.0P_0$).

Comparative Example 3

(1) 163.64 g (0.985 mols) of terephthalic acid, 134.55 g (0.85 mols) of 1,9-nonanediamine, 23.74 g (0.15 mols) of 2-methyl-1,8-octanediamine, 3.664 g (0.030 mols) of benzoic acid, 0.326 g of sodium hypophosphite monohydrate, and 108.64 g of water were put into a one-liter autoclave, and purged with nitrogen. The amount of water existing in the reaction system was 25% by weight. Heating this for 2 hours, its inner temperature reached 260° C. In that condition, the compounds were reacted for 1 hours with the reactor closed. Then, this was heated up to 330° C. over a period of 30 minutes, and the reaction was continued at 330° C. for 30 minutes. Next, the reactor was opened to have atmospheric pressure, and then degassed to have a reduced pressure of 1 mm Hg. In that condition, the reaction was further continued for 30 minutes to directly obtain a polyamide. During the reaction, the system was stirred all the time.

(2) Next, while the reactor was kept pressurized with nitrogen at 1 kgf/cm$^2$, the polyamide therein was standwise discharged through the nozzle at the bottom of the reactor into a cooling water tank over a period of 15 minutes, and pelletized. The limiting viscosity of the polyamide was measured according to the method mentioned above, and shown in Table 2.

(3) The polyamide obtained in (2) was formed into JIS No. 1 dumbbell-type test pieces (thickness: 3 mm) through injection molding, for which the cylinder temperature was 330° C. and the mold temperature was 150° C. Their tensile strength and tensile elongation were measured according to the methods mentioned above, and shown in Table 2.

Comparative Example 4

(1) 163.64 g (0.985 mols) ofterephthalic acid, 134.55 g (0.85 mols) of 1,9-nonanediamine, 23.74 g (0.15 mols) of 2-methyl-1,8-octanediamine, 3.664 g (0.030 mols) of benzoic acid, 0.326 g of sodium hypophosphite monohydrate, and 108.64 g of water were put into a one-liter autoclave, and purged with nitrogen. The amount of water existing in the reaction system was 25% by weight. Heating this for 2 hours, its inner temperature reached 260° C. In that condition, the compounds were reacted for 1 hour. During the reaction, the system was stirred all the time, but the reactor was often degassed to keep its inner pressure at 20 kg/cm$^2$ (0.43P$_0$). The amount of water discharged during the reaction was 104 g.

(2) Next, while the inner temperature of the reactor was kept at 260° C. and the amount of water existing in the reactor was 25% by weight, the reaction product in (1) was taken out of the reactor into a collector having a nitrogen atmosphere and having ordinary temperature and ordinary pressure, over a period of 3 minutes, through the nozzle (6 mm in diameter) at the bottom of the reactor. Then, this was dried at 120° C. to obtain a powdery primary polycondensate. The bulk density and the limiting viscosity of this primary polycondensate were measured according to the methods mentioned above, and shown in Table 2.

(3) 250 g of the powdery primary polycondensate obtained in (2) was put into a one-liter, round-bottom flask, and purged with nitrogen. With nitrogen being introduced thereinto at a flow rate of 300 ml/min, this was stirred and heated, and its inner temperature reached 250° C. over a period of 2 hours. In that condition, this was polymerized for 5 hours in a solid phase to give a polyamide. The resulting polyamide was cooled to around room temperature, and then taken out of the round-bottom flask. Its limiting viscosity was measured according to the method mentioned above, and shown in Table 2.

(4) The polyamide obtained in (3) was formed into JIS No. 1 dumbbell-type test pieces (thickness: 3 mm) through injection molding, for which the cylinder temperature was 330° C. and the mold temperature was 150° C. Their tensile strength and tensile elongation were measured according to the methods mentioned above, and shown in Table 2.

TABLE 1

|  | Example 1 | Example 2 | Example 3 | Example 4 |
|---|---|---|---|---|
| [Starting Monomer Composition[1)]] | | | | |
| Dicarboxylic Acid Component (mol %) | TA 100 | TA 100 | TA 100 | TA 100 |
| Diamine Component (mol %) | NMDA 85 | NMDA 100 | NMDA 50 | NMDA 85 |
|  | MODA 15 |  | MODA 50 | MODA 15 |
| [Production of Primary Polycondensate] | | | | |
| Polycondensation Condition Reaction Temperature (° C.) | 260 | 270 | 250 | 270 |
| Reaction Pressure (atmospheres) | 46 | 54 | 39 | 54 |
| (as P$_0$) | (1.0 P$_0$) | (1.0 P$_0$) | (1.0 P$_0$) | (1.0 P$_0$) |
| Amount of Water (wt. %) | 25 | 30 | 25 | 20 |
| Reaction Time | 1 hr | 1 hr | 1 hr | 1 hr |
| Physical Properties of Primary Polycondensate | | | | |
| Bulk Density | 0.32 | 0.33 | 0.32 | 0.34 |
| Limiting Viscosity [η] (dl/g) | 0.21 | 0.16 | 0.15 | 0.20 |
| [Production of Polyamide] | | | | |
| Polymerization Condition | solid-phase | solid-phase | solid-phase | melt |
| Polymerization Method | polymerization | polymerization | polymerization | polymerization |
| Polymerization Temperature (° C.) | 250 | 250 | 230 | 330 |
| Polymerization Time | 5 hr | 5 hr | 10 hr | 5 min[2)] |
| Physical Properties of Polyamide Limiting Viscosity | | | | |
| Limiting Viscosity [η] (dl/g) | 1.31 | 1.26 | 1.30 | 1.29 |
| Tensile Strength (kgf/cm$^2$) | 950 | 970 | 900 | 950 |
| Tensile Elongation (%) | 19 | 17 | 22 | 19 |

[1)]TA: terephthalic acid, NMDA: 1,9-nonanediamine, MODA: 2-methyl-1,8-octanediamine
[2)]mean residence time in extruder

TABLE 2

|  | Comparative Example 1 | Comparative Example 2 | Comparative Example 3 | Comparative Example 4 |
|---|---|---|---|---|
| [Starting Monomer Composition[1)]] | | | | |
| Dicarboxylic Acid Component (mol %) | TA 100 | TA 100 | TA 100 | TA 100 |
| Diamine Component (mol %) | NMDA 85 | NMDA 85 | NMDA 85 | NMDA 85 |
|  | MODA 15 | MODA 15 | MODA 15 | MODA 15 |

TABLE 2-continued

|  | Comparative Example 1 | Comparative Example 2 | Comparative Example 3 | Comparative Example 4 |
|---|---|---|---|---|
| [Production of Primary Polycondensate] | | | | |
| Polycondensation Condition Reaction Temperature (° C.) | 260 | 260 | (melt polymerization) 260 to 330[4)] | 260 |
| Reaction Pressure (atmospheres) (as $P_0$) | 46 (1.0 $P_0$) | 46 (1.0 $P_0$) | —[4)] | 20 (0.43 $P_0$) |
| Amount of Water (wt. %) | 60 | 5 | 25 | 25 |
| Reaction Time | 1 hr | 1 hr[3)] | 3 hr[4)] | 1 hr |
| Physical Properties of Primary Polycondensate | | | | |
| Bulk Density | 0.35 | —[3)] | — | 0.32 |
| Limiting Viscosity [η] (dl/g) | 0.06 | —[3)] | | 0.13 |
| [Production of Polyamide] | | | | |
| Polymerization Condition Polymerization Method | solid-phase polymerization[2)] | —[3)] | | solid-phase polymerization |
| Polymerization Temperature (° C.) | 250 | —[3)] | | 250 |
| Polymerization Time | 5 hr | —[3)] | | 5 hr |
| Physical Properties of Polyamide | | | | |
| Limiting Viscosity [η] (dl/g) | —[2)] | —[3)] | 1.25 | 0.80 |
| Tensile Strength (kgf/cm$^2$) | —[2)] | —[3)] | 510 | 600 |
| Tensile Elongation (%) | —[2)] | —[3)] | 3 | 3 |

[1)]TA: terephthalic acid, NMDA: 1,9-nonanediamine, MODA: 2-methyl-1,8-octanediamine
[2)]As the primary polycondensate grains fused during solid-phase polymerization, the system was cut off.
[3)]As the system was entirely solidified in the step of forming the primary polycondensate, the product could not be taken out of the reactor.
[4)]The polyamide was produced through direct melt polymerization of the dicarboxylic acid component and the diamine component.

In Examples 1 to 4, a dicarboxylic acid component having a terephthalic acid content of from 60 to 100 mol % and a diamine component, in which the amount of at least one of 1,9-nonanediamine and 2-methyl-1,8-octanediamine falls between 60 and 100 mol %, were polycondensed in the presence of water of being from 15 to 35% by weight, at a reaction temperature falling between 250° C. and 280° C. and under a reaction pressure (P) falling between $P_0$ and 0.7$P_0$ (where $P_0$ indicates the saturated vapor pressure of water at the reaction temperature) to form a primary polycondensate and the resulting primary polycondensate was taken out of the reactor in an atmospheric environment while it was at a temperature within the same range as in the previous step and had a water content within the same range as in the previous step. From the data in Table 1 above, it is shown that non-foaming primary polycondensates were obtained in those Examples 1 to 4, that they had a high bulk density and were easy to handle and their volume efficiency was high, and that they had a high limiting viscosity and could be smoothly subjected to the subsequent solid-phase or melt polymerization to give polyamides. In addition, it is shown that the polyamides as formed from those primary polycondensates through subsequent solid-phase or melt polymerization had a high limiting viscosity and their moldings had good mechanical properties typically including tensile strength and tensile elongation.

In Comparative Example 1, a dicarboxylic acid component having a terephthalic acid content of from 60 to 100 mol % and a diamine component, in which the amount of at least one of 1,9-nonanediamine and 2-methyl-1,8-octanediamine falls between 60 and 100 mol %, were polycondensed at a reaction temperature falling between 250° C. and 280° C. and under a reaction pressure (P) falling between $P_0$ and 0.7$P_0$ to form a primary polycondensate, but the amount of water existing in the reaction system was larger than 35% by weight. As in Table 2, it is shown that the primary polycondensate formed in this Comparative Example 1 had an extremely low limiting viscosity and could not be smoothly polymerized in the next solid-phase polymerization step.

In Comparative Example 2, a dicarboxylic acid component having a terephthalic acid content of from 60 to 100 mol % and a diamine component, in which the amount of at least one of 1,9-nonanediamine and 2-methyl-1,8-octanediamine falls between 60 and 100 mol %, were polycondensed at a reaction temperature falling between 250° C. and 280° C. and under reaction pressure (P) falling between $P_0$ and 0.7$P_0$ to form a primary polycondensate, but the amount of water existing in the reaction system was smaller than 15% by weight. As in Table 2, it is shown that the polycondensation system in this Comparative Example 2 was solidified during the reaction and the product could not be taken out of the reactor.

In Comparative Example 3, a dicarboxylic acid component having a terephthalic acid content of from 60 to 100 mol % and a diamine component, in which the amount of at least one of 1,9-nonanediamine and 2-methyl-1,8-octanediamine falls between 60 and 100 mol %, were not previously polycondensed into a primary polycondensate but were directly polymerized through one-step melt polymerization into a polyamide. As in Table 2, it is shown that the tensile strength and the tensile elongate on of the polyamide produced were both extremely low, and the mechanical properties thereof were not good.

In Comparative Example 4, a dicarboxylic acid component having a terephthalic acid content of from 60 to 100 mol % and a diamine component, in which the amount of at least one of 1,9-nonanediamine and 2-methyl-1,8-octanediamine falls between 60 and 100 mol %, were polycondensed in the presence of water of being from 15 to 35% by weight, at a reaction temperature falling between 250° C. and 280° C. to form a primary polycondensate and the resulting primary polycondensate was taken out of the reactor in an atmospheric environment while it was at a temperature within the same range as in the previous step and had a water content within the same range as in the previous step, but the pressure in the polycondensation system to give the primary polycondensate was lower than $0.7P_0$. As in Table 2, the limiting viscosity of the primary polycondensate prepared was low, and the limiting viscosity, the tensile strength and the tensile elongation of the polyamide produced from it were all low. It is shown that the mechanical properties of the polyamide were not good.

Obviously, numerous modifications and variations of the present invention are possible in light of the above teachings. It is therefore to be understood that within the scope of the appended claims, the invention may be practiced otherwise than as specifically described herein.

This application is based on Japanese Patent Application Serial Nos. 11-123804 and 10-228535, filed on Apr. 30, 1999 and Jul. 30, 1998, respectively, both of which are incorporated herein by reference in their entirety.

What is claimed is:

1. A method for producing polyamides, comprising:

(i) polycondensing a dicarboxylic acid component having a terephthalic acid content of from 60 to 100 mol % and a diamine component in which the amount of at least one of 1,9-nonanediamine and 2-methyl-1,8-octanediamine is 60 to 100 mol %, in a reactor, in the presence of water in an amount of from 15 to 35% by weight based on the weight of the reaction mixture in the reactor, at a reaction temperature of from 250° C. to 280° C., and under a reaction pressure, P, that satisfies the following formula (1):

$$P_0 \geq P \geq 0.7P_0 \tag{1}$$

wherein $P_0$ is the saturated vapor pressure of water at the reaction temperature, to form a primary polycondensate;

(ii) removing the primary polycondensate from the reactor, wherein the temperature in the reactor is 250° C. to 280° C. and the water content of the reaction mixture in the reactor is 15 to 35% by weight; followed by (iii) solid-phase or melt polymerizing the primary polycondensate to provide a polyamide having an increased molecular weight.

2. The method of claim 1, wherein the polycondensation is conducted in the presence of a phosphorus-based catalyst.

3. The method of claim 1, wherein the polycondensation is conducted in the presence of a terminal-blocking agent.

4. The method of claim 1, wherein the primary polycondensate is solid phase polymerized in (iii).

5. The method of claim 1, wherein the primary polycondensate is melt polymerized in (iii).

6. The method of claim 1, wherein the terephthalic acid content of the dicarboxylic acid component is 75 to 100 mol %.

7. The method of claim 1, wherein the dicarboxylic acid component further comprises at least one member selected from the group consisting of aliphatic dicarboxylic acids, alicyclic dicarboxylic acids, and aromatic dicarboxylic acids.

8. The method of claim 1, wherein the dicarboxylic acid component further comprises at least one member selected from the group consisting of aromatic dicarboxylic acids.

9. The method of claim 1, wherein the dicarboxylic acid component further comprises at least one member selected from the group consisting of polycarboxylic acids.

10. The method of claim 9, wherein the polycarboxylic acids are selected from the group consisting of trimellitic acid, trimesic acid, and pyromellitic acid.

11. The method of claim 1, wherein the diamine component comprises 1,9-nonanediamine.

12. The method of claim 1, wherein the diamine component comprises 2-methyl-1,8-octanediamine.

13. The method of claim 1, wherein the diamine component comprises 1,9-nonanediamine and 2-methyl-1,8-octanediamine.

14. The method of claim 1, wherein the diamine component further comprises at least one member selected from the group consisting of linear, aliphatic diamines, branched chain aliphatic diamines, and aromatic diamines.

15. The method of claim 1, wherein the diamine component further comprises at least one member selected from the group consisting of 1,6-hexanediamine, 1,7-heptanediamine, 1,8-octanediamine, 1,10-decanediamine, 1,11-undecanediamine, and 1,12-dodecanediamine.

16. The method of claim 1, wherein the amount of water in the reaction mixture is 20 to 30% by weight.

17. The method of claim 1, wherein the polycondensate cools to 130° C. or less after being removed from the reactor.

18. The method of claim 1, wherein the polycondensate has a limiting viscosity, η, of at least 0.08 dl/g when measured in concentrated sulfuric acid at 30° C.

19. The method of claim 1, wherein the polycondensate is in the form of grains having a bulk density of at least 0.25.

20. A method for producing a primary polycondensates, comprising:

(i) polycondensing a dicarboxylic acid component having a terephthalic acid content of from 60 to 100 mol % and a diamine component in which the amount of at least one of 1,9-nonanediamine and 2-methyl-1,8-octanediamine is 60 to 100 mol %, in a reactor, in the presence of water in an amount of from 15 to 35% by weight based on the weight of the reaction mixture in the reactor, at a reaction temperature of from 250° C. to 280° C., and under a reaction pressure, P, that satisfies the following formula (1):

$$P_0 \geq P \geq 0.7P_0 \tag{1}$$

wherein $P_0$ is the saturated vapor pressure of water at the reaction temperature, to form a primary polycondensate; and (ii) removing the primary polycondensate from the reactor, wherein the temperature in the reactor is 250° C. to 280° C. and the water content of the reaction mixture in the reactor is 15 to 35% by weight.

21. The method of claim 20, wherein the polycondensation is conducted in the presence of a phosphorus-based catalyst.

22. The method of claim 20, wherein the polycondensation is conducted in the presence of a terminal-blocking agent.

* * * * *